United States Patent [19]

Duffield et al.

[11] 4,061,706
[45] Dec. 6, 1977

[54] PROCESS FOR THE CONTINUOUS MELT THERMOFORMING OF POLYMERS

[75] Inventors: Peter Roe Duffield, Toronto; Peter Robin Flockton, St. Lambert; Rupert Martin Lillis, Glen Burnie; Brian Maurice Turner, Sarnia; Donald Edward Crowell, Kingston, all of Canada

[73] Assignee: Du Pont of Canada Limited, Montreal, Canada

[21] Appl. No.: 624,972

[22] Filed: Oct. 22, 1975

Related U.S. Application Data

[63] Continuation of Ser. No. 443,343, Feb. 19, 1974, abandoned.

[30] Foreign Application Priority Data

Feb. 28, 1973 Canada .................................. 164867

[51] Int. Cl.² .............................................. B29C 17/04
[52] U.S. Cl. ...................................... 264/90; 425/388
[58] Field of Search ............... 264/89, 90, 92, 93, 264/94; 425/388, 326 R; 53/140; 428/35, 220

[56] References Cited

U.S. PATENT DOCUMENTS

| 3,333,032 | 7/1967 | Dickinson | 264/90 X |
|---|---|---|---|
| 3,353,219 | 11/1967 | Snyder | 264/90 X |
| 3,381,445 | 5/1968 | Vogt | 53/140 |
| 3,453,162 | 7/1969 | Turner | 264/90 X |
| 3,527,854 | 9/1970 | Martin et al. | 264/89 |
| 3,685,930 | 8/1972 | Davis et al. | 264/90 X |

FOREIGN PATENT DOCUMENTS

| 820,769 | 8/1969 | Canada. |
|---|---|---|
| 834,029 | 2/1970 | Canada. |
| 933,714 | 9/1973 | Canada. |
| 1,136,613 | 12/1968 | United Kingdom. |
| 1,268,571 | 3/1972 | United Kingdom. |
| 1,333,720 | 10/1973 | United Kingdom. |

*Primary Examiner*—Jan H. Silbaugh

[57] ABSTRACT

A process for the continuous melt thermoforming of thermoplastic polymers is disclosed. The process comprises extruding a flat web of molten polymer in a downward direction and directly over a series of mould cavities moving at a predetermined speed thereby sequentially covering the mould cavities. A vacuum is applied to the mould cavities and the web of molten polymer is brought into contact with the surface of the mould cavity, the mould defining the mould cavity being comprised of porous metal. The polymer is cooled and the resultant article is removed from the mould. The process is controlled so that the articles thermoformed in the process are of substantially uniform thickness. In embodiments the mould cavities are located on the periphery of a continuous belt or preferably a wheel. The process may be operated with polymers of low zero shear viscosity. The preferred polymers are polyamides, especially polyhexamethylene adipamide, of relative viscosity in the range 25 to 65. Substantially inflexible open containers comprised of a polyamide having a relative viscosity in the range 25 to 65 are also disclosed. The containers may be of thickness in the range of 2 to 30 mils.

20 Claims, 2 Drawing Figures

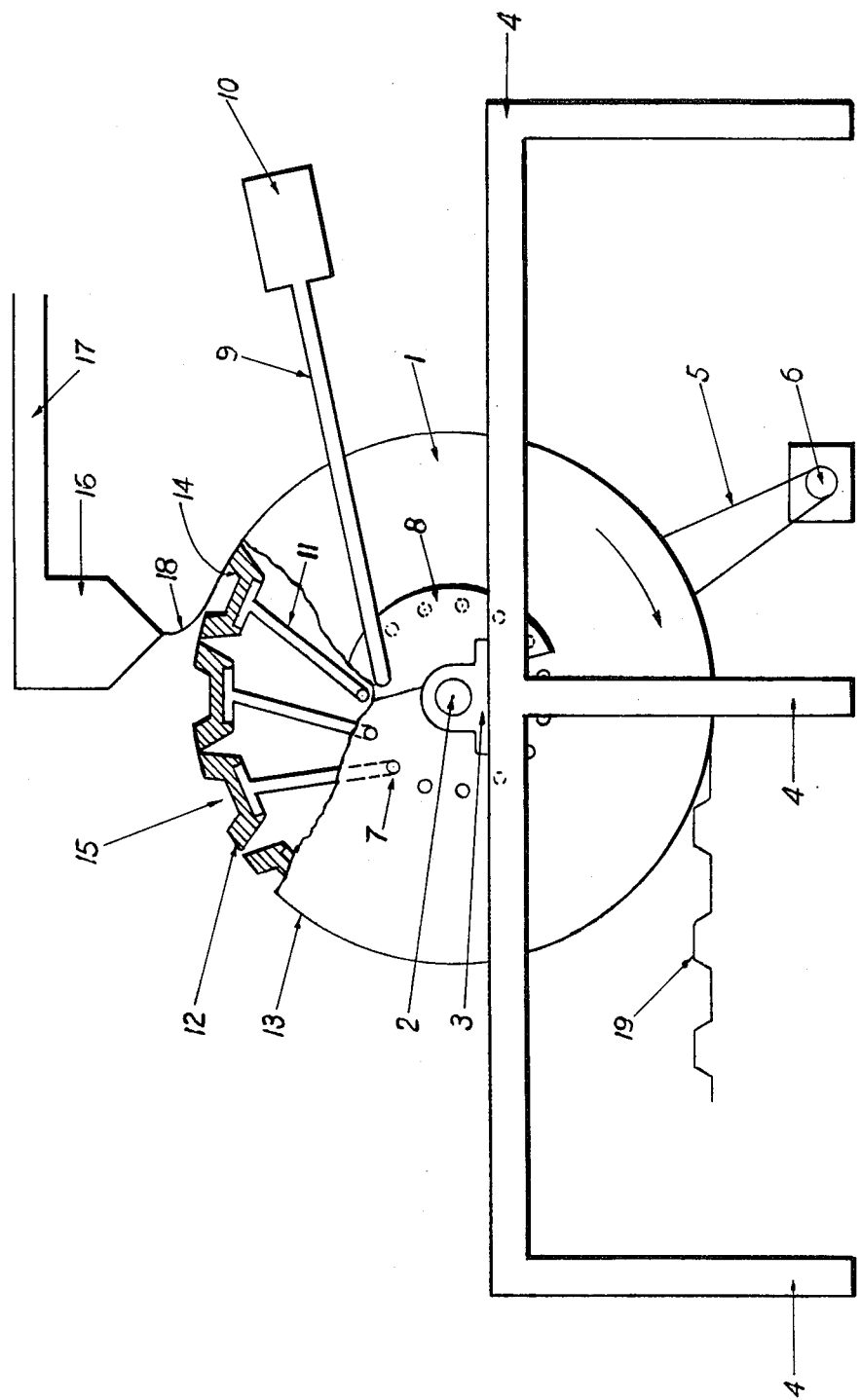
FIG. I

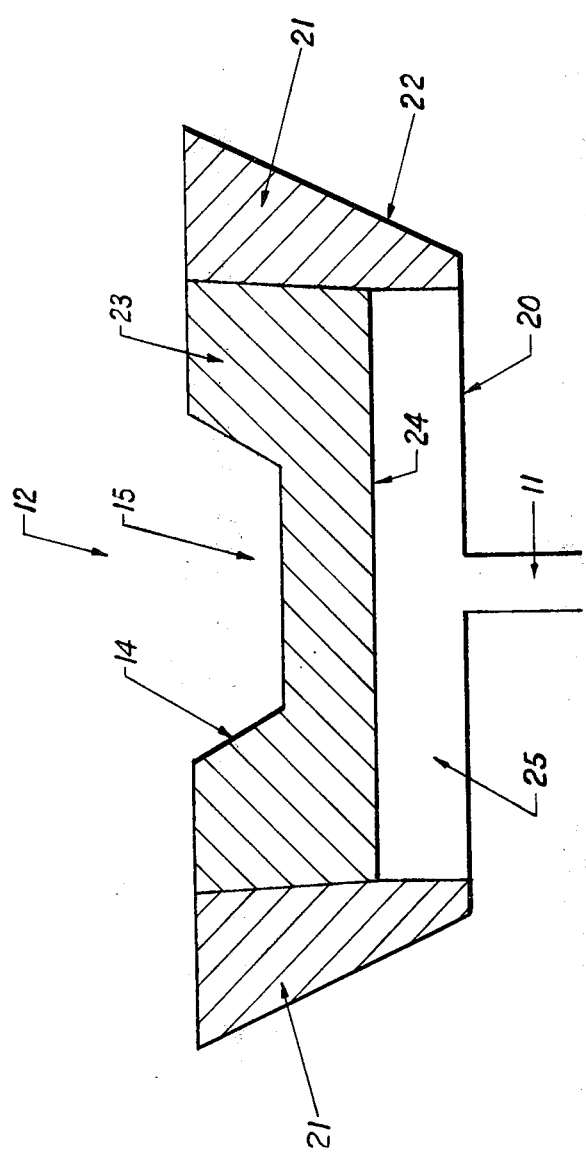

PROCESS FOR THE CONTINUOUS MELT THERMOFORMING OF POLYMERS

This is a continuation, of application Ser. No. 443,343, filed 2/19/74, now abandoned.

The present invention relates to a continuous process for melt thermoforming thermoplastic polymers, thermoforming being the forming of articles from heated sheet-like thermoplastic polymers, as is discussed hereinafter. In particular, the present invention relates to a continuous melt thermoforming process in which the zero shear viscosity of the thermoplastic polymer being thermoformed may not be a critical factor over a wide range of zero shear viscosity values, the term zero shear viscosity also being defined hereinafter. The present invention also relates to containers comprised of polyamides.

The thermoforming of thermoplastic polymers is known. In a typical process, the thermoplastic polymer is extruded in sheet form and cooled. The sheets of thermoplastic polymer are subsequently reheated, for example by a hot roll, by a convection oven or by infrared heaters, placed over a mould and formed to the shape of the mould by the application of vacuum to the mould or by the application of pressure to the sheet. The heated sheet while being moved from the heating zone to the mould or while awaiting the thermoforming cycle may be in a substantially unsupported condition. The thermoplastic polymers and the process conditions used in such processes should, therefore, be selected so that there is minimal distortion of the sheet. Under the low shear stress conditions occurring when the sheet is in an unsupported condition, any such distortion may be in the form of sagging of the sheet and may result in an inferior and/or unacceptable product. A measure of the ability of a polymer in sheet form to resist distortion under low shear stress is given by the zero shear viscosity of the polymer. Zero shear viscosity may be obtained by known techniques, for example from data obtained by the technique of ASTM D-1238 or by the use of a Weissenberg Rheogoniometer TM. These process limitations restrict the types of thermoplastic polymers that may be used in the process. Moreover, thermoforming processes using reheated sheets of thermoplastic polymers while being continuous processes, generally are characterized by intermittent movement of the sheets of thermoplastic polymer.

A process for the continuous manufacture of articles from an extruded sheet of foamed thermoplastic material is described by T. W. Winstead in Canadian Pat. No. 871,807 which issued on 25th May 1971. This process would also appear to be limited by the ability of the polymer used to withstand significant distortion between the extrusion and thermoforming steps.

Apparatus for the vacuum forming of continuous sheets of thermoplastic polymer is described by G. Martelli et al. in U.S. Pat. No. 2,902,718 which issued on 8th Sept. 1959. It would appear that the type of continuous sheet of thermoplastic polymer that may be used in this apparatus is restricted to those types that have sufficient flexibility to permit the continuous sheet to be fed to the rotary forming apparatus and to those types of polymers that are of sufficiently high zero shear viscosity to prevent distortion of the sheet when in a heated condition.

A continuous melt thermoforming process has now been found in which the zero shear viscosity of the polymer used is not critical over a wide range of zero shear viscosity values. Moreover, the process may be used for the manufacture of articles of relatively low thickness having a low degree of flexibility.

Accordingly, the present invention provides a process for the continuous melt thermoforming of articles of substantially uniform thickness derived from a thermoplastic polymer comprising the steps of:

a. extruding a flat web of molten polymer in a downward direction and directly over a series of mould cavities moving at a predetermined speed, and sequentially covering said mould cavities with said flat web, b. applying a vacuum to the mould cavities sufficient to cause the web of molten polymer to contact the surface of the mould cavity, the mould defining said mould cavity being comprised of porous metal, c. cooling the polymer in said cavities, d. maintaining substantially uniform thickness of the articles by controlling the extrusion of the flat web of polymer, the application of vacuum, the contacting of the web of molten polymer with the mould cavities and the speed at which the mould cavities move, and e. removing the article.

In an embodiment of the process of the present invention, the mould cavities are located on the periphery of a continuous belt or, preferably, a wheel.

In a further embodiment of the process of the invention, the vacuum is applied immediately after the web of molten polymer is extruded over the mould cavity.

In another embodiment of the process of the invention the moulds defining the mould cavities are made of porous metal of pore size of less than 12 microns.

In still another embodiment of the process of the invention, the periphery of the wheel or continuous belt, at least in that section defining the mould cavities, is made of porous metal.

In yet another embodiment of the process of the invention, the polymer is a polyamide.

The present invention also provides articles manufactured by the process of the present invention.

Furthermore, the present invention provides a substantially inflexible open container comprised of polyamide having a relative viscosity in the range about 25 to 65, relative viscosity being defined hereinafter.

In addition the present invention provides a substantially inflexible open-topped container comprised of polyamide having a relative viscosity in the range of about 25 to 65, said container having inwardly sloping sides and a ratio of the width, of said container, to the depth of said container, of at least 3:1.

In an embodiment of the containers of the present invention the polyamide is of relative viscosity in the range 25 to 50.

In another embodiment the containers are of thickness in the range 2 to 30 mils and especially 5 to 20 mils.

In a further embodiment the polyamide of the containers is polyhexamethylene adipamide.

An embodiment of the process of the present invention will be described with reference to the apparatus shown in the drawings in which:

FIG. I is a schematic representation partially in section of a side view of an embodiment of a continuous melt thermoforming apparatus;

FIG. II is a schematic representation of a side view of an embodiment of a mould cavity.

In FIG. I, axle 2 of forming wheel 1 is rotatably mounted in bearing 3 located on frame 4. Forming wheel 1 is adapted to be rotated in a clockwise direction by drive belt 5 driven by motor 6. Vacuum ports 7 are radially located about axis 2 and are aligned with segmental vacuum flange 8, which in the embodiment shown is approximately semicircular. Vacuum flange 8 is adapted to connect vacuum ports 7 to vacuum source 10, via pipe 9, over a predetermined segment of a rotation of forming wheel 1. Vacuum ports 7 are individually connected by tubes 11 to a series of moulds 12 located on the periphery 13 of forming wheel 1. Moulds 12, an embodiment of which is shown in more detail in FIG. II, have mould surfaces 14 forming a mould cavity 15 of desired shape.

Although it is preferred that moulds 12 be located on the periphery 13 of a forming wheel 1 the moulds may be located on other suitable moving surfaces, for example on a belt.

In the operation of the process of the embodiment of the present invention described hereinabove, forming wheel 1 is rotated in a clockwise direction. Die 16 is aligned transversely with the direction of movement of moulds 12 and at a short distance therefrom. Die 16 is located so that, when a web of molten polymer 18 is extruded from die 16 so as to sequentially cover all of each of the mould cavities 15 of moulds 12, the web of molten polymer is extruded in a downward direction. The position of vacuum flange 8 is adjusted so that vacuum is applied to each mould cavity 15 shortly after the web of molten polymer 18 covers all of mould cavity 15. Immediately prior to the application of vacuum, the web of molten polymer 18 covers mould cavity 15 but essentially does not contact the surface 14 of the mould cavity 15. On the application of vacuum, the web of molten polymer 18 is brought into contact with surface 14 of mould cavity 15 thereby thermoforming the polymer to the shape of mould cavity 15. The length of the period of time between the covering of mould cavity 15 with the web of molten polymer 18 and the application of the vacuum may be an important variable in the control of the process of the present invention. The thermoformed polymer cools while in contact with the surface 14 of mould cavity 15.

On further rotation of forming wheel 1, vacuum port 7 becomes out of contact with vacuum flange 8 and a vacuum is no longer applied to mould cavity 15. Subsequently, the thermoformed articles 19 may be separated from mould cavities 15 and from forming wheel 1. The individual thermoformed articles may be obtained by any convenient trimming operation.

It may be desirable to cool forming wheel 1 during one or more segments of the rotation of wheel. Such cooling may by external cooling means, for example by using a fan to blow air onto the wheel, or by internal cooling means, for example by passing a cooled liquid through pipes or the like suitably located within forming wheel 1. Forming wheel 1 may be cooled throughout the rotation of the wheel, or during one or more segments of the rotation of the wheel, for example during the segment when no polymer is in contact with forming wheel 1 and/or during the segment where vacuum is applied to mould cavity 15. Forming wheel 1 should be cooled to the extent necessary to ensure that thermoformed articles 19 exhibit minimal distortion on removal from forming wheel 1.

It may be desirable to bring a conveyor belt into contact with thermoformed articles 19 prior to or after the separation of thermoformed articles 19 from forming wheel 1 to aid in the removal of these articles from forming wheel 1 and/or to aid in the conveying of the articles to a trimming operation.

The moulds used in the process of the present invention and the thermoforming unit used therewith may be constructed in a manner that permits the moulds to be readily interchanged. An embodiment of a preferred mould design is shown in FIG. II. In the Figure, which schematically represents a cross section of a mould 12, the mould 12 has a base plate 20 having connected thereto tube 11 from vacuum port 7 (not shown). Base plate 20 is attached at the outer edges to mould supports 21. The outer edge 22 of mould support 21 is inwardly and downwardly sloping to facilitate removal of mould 12 from forming wheel 1 (not shown). Mould cavity 15 formed by mould surface 14 is in mould block 23. Mould block 23 is between and supported by mould support 21 and may be adapted to be removed therefrom. The lower surface 24 of mould block 23 is spaced from base plate 20, thereby forming cavity 25. Mould block 23 is fabricated from porous metal thus allowing vacuum to be uniformly transmitted between cavity 25, which is connected by tube 11 to vacuum port 7, and mould cavity 15.

As stated hereinabove mould block 23 is fabricated from porous metal. Moulds having porous metal sections may be constructed by a number of techniques. For example, a mould partially constructed from porous metal may be obtained by positioning porous metal sheets so that at least a portion of surface 14 of mould cavity 15, especially flat areas thereof, are formed from the porous metal sheets. The porous metal sheets may be maintained in the desired position by using solid metal inserts which themselves form the remainder of the surface 14 of mould cavity 15. Such porous metal sheets may be made from sintered metals such as bronze or stainless steel or from diffusion bonded stainless steel wire mesh laminate. Alternatively, the moulds may be constructed in their entirety from porous sintered metals, for example by machining a block of porous sintered metal or by forming the mould block 23 directly from the powdered metal. The porous mould may also be formed from wire mesh laminate by forming the laminate into the desired mould shape under pressure. For the process of the present invention, it is preferred that the pore size of the porous metal forming mould block 23 be less than about 12 microns.

The use of porous metals in the construction of the mould may result in the production of thermoformed articles of improved appearance, especially with polymers of low zero shear viscosity. The thermoforming of such polymers in moulds to which vacuum is applied by means of grooves, channels and the like in mould block 23, as is known, may result in polymer, especially low zero shear viscosity polymers, being drawn or partially drawn into the grooves and channels thereby giving a product of inferior and/or unacceptable appearance. The use of porous metal moulds is an important feature of the process for the continuous melt thermoforming of polymers of low zero shear viscosity.

The process of the present invention may be operated with a wide range of thermoplastic polymers and especially with polymers of low zero shear viscosity. The essential requirement for such polymers is that the polymers must be capable of being extruded at a practical and controllable rate through a die and must be capable of being thermoformed in a mould to give a thermoformed article of acceptable properties. Such polymers may include polymers that are capable of being connected into film by blown film techniques, pipe, sheet, blow moulded articles e.g., bottles, and the like. However, it is an important feature of the process of the present invention that the process is operable with a wide range of polymers that are not capable of being so converted. For example, some thermoplastic polymers exhibit a zero shear viscosity that is too low to permit the conversion of such polymers into film by blown film techniques, pipe, sheet, blow moulded articles e.g., bottles and the like of acceptable properties. Such low zero shear viscosity polymers may be capable of being thermoformed by the process of the present invention into products of acceptable properties for the end use envisaged.

Examples of polymers that may be thermoformed by the process of the present invention are polyamides e.g., polycaprolactam (nylon 6), polyhexamethylene adipamide (nylon 66), poly-11-amino undecanoic acid (nylon 11), and poly-12-amino dodecanoic acid (nylon 12), polyesters, polyolefins, e.g., ethylene polymers and copolymers, polypropylene and polymethylpentene-1, ionomeric resins especially the resins available under the trademark "Surlyn", acetals, polycarbonates, polysulfones and polyacrylates. Preferred polymers are polyamides especially nylon 66 and preferably nylon 66 having a relative viscosity of greater than 25 and especially in the range 25 to 65 and in particular the range 25 to 50, and polyamides of equivalent viscosity. More preferred ranges of relative viscosity are 30 to 45 and especially 30 to 40. Relative viscosity is the ratio of viscosity in centipoises at 25° C. of a 8.4% by weight solution of nylon 66 in 90% formic acid (90% formic acid and 10% water, by weight) to the viscosity in centipoises at 25° C. of the 90% formic acid alone.

The physical properties of the polymer being thermoformed, especially at elevated temperatures, may be important. For example, the web of molten polymer must be capable of being brought into contact with the surface of the mould on the application of vacuum and the resultant thermoformed article should exhibit minimal distortion while being removed from, or subsequent to being removed from, the mould. The rate of crystallization and the degree of crystallization attained by the polymer may therefore be important properties of the polymer. Thus the process conditions used in the thermoforming process, for example, the process conditions used in the extrusion of the web of molten polymer, the temperature of the polymer and mould, the optional use of techniques to cool the web of molten polymer, the moulds and/or the moulded article as well as the effect of any additives, especially nucleating agents, blended into the polymer may be important in the operation of the process of the present invention.

The web of molten polymer is extruded in the form of a flat web in a downward direction. Extrusion in a downward direction is an important feature of the present invention as the low zero shear viscosity polymers that may be used in the process of the present invention are generally not of sufficient melt strength to permit extrusion in an upward direction, melt strength also being attainable from data obtained by the method of ASTM D-1238. The die may be located above the thermoforming wheel and above the axis of the wheel or offset therefrom.

The extrusion conditions, for example, the temperature and thickness of the web of molten polymer, may be important factors in the operation of the process of the invention. Control of the position and angle of contact of the web of molten polymer with the thermoforming wheel may also be important.

The technique used for the application of vacuum may affect the appearance and uniformity of the thermoformed articles, especially in the thermoforming of polymers of low zero shear viscosity. After extrusion of the web of molten polymer over the mould cavity but prior to the application of vacuum the web of polymer over the cavity may exhibit a tendency to distort or sag, especially in the case of low zero shear viscosity polymers. If the polymer sags sufficiently, it will contact the lower surface of the mould cavity thus resulting in cooling of the polymer, referred to hereinafter as "pre-chill", thereby enhancing the probability of the non-uniformity and/or poor appearance of the thermoformed article. The tendency for pre-chill may depend on the length of the mould as measured in the direction of movement of the mould and it may be desirable to reduce the period of time between the completion of the extrusion of the web of polymer over the mould cavity and the application of the vacuum, thereby decreasing the time during which the web of polymer can sag before being brought into contact with the mould surface by the application of vacuum. The rate of application of vacuum may also be an important process variable.

The shape of the article being thermoformed may be a factor in the operation of the process of the present invention, and may be interrelated with the characteristics of the polymer and the rate of movement of the moulds. For example, in the manufacture of articles of low depth, e.g., about 0.5 in., the design of the article may be significantly less critical than for similar articles of greater depths, e.g., 1.5 in. The effect of the shape of the article being thermoformed is particularly manifested in the uniformity of thickness of the article produced, and especially when low zero shear viscosity polymers are being used. The thermoforming of articles may become more critical as the depth of the mould increases, as the length of the mould increases, the length being measured in the direction of the movement of the mould, and as the angle of the side of the mould, with respect to the plane in which the web of molten polymer is laid over the mould, increases. For each particular combination of polymer, mould and process conditions there may be a minimum rate of movement of the mould above which the process should be operated in order to obtain articles of acceptable quality. Thus for a particular combination of polymer and mould the process conditions must be selected so as to obtain articles of acceptable quality.

The mould design may result in the manufacture of articles in which the thickness of some sections is different from the thickness of other sections. For example, in the case of the manufacture of pie plates, the shape of the pie plate mould may result in the flat central area of the pie plate being of a different thickness than sloped edge areas of the pie plate. Apart from such thickness differences which primarily result from the design of the article being manufactured, it is preferred that the process be controlled so that the articles produced are of substantially uniform thickness. For example, in a process for the manufacture of pie plates it is preferred that comparable areas of the pie plate located in front and rear positions, in terms of direction of rotation of the forming wheel and therefore the direction of movement of the mould, be of similar thickness. In a process in which the control may be improved, the comparable front and rear sections of the pie plate, in this example, may be of substantially different thickness. Control of the process variables, especially the rate of movement of the mould and the point of vacuum application, is important in the manufacture of articles of uniform thickness.

In preferred embodiments, the process may be used for the production of articles having a ratio of the width of the article to the depth of the article that is greater than 1:1, especially greater than 3:1. Examples of suitable articles are pie plates, trays and the like. The thickness of such articles produced by the process of the invention may be varied over a wide range. The upper range of thickness may be dependent on economics and the ability of the extrusion apparatus to extrude thick webs of polymer. The process may be used in the manufacture of articles of low thickness, especially articles of 2 to 30 mils, in particular 5 to 20 mils and more particularly 8 to 15 mils. The properties of such articles will be dependent on the properties of the polymer used and the design of the article.

The articles of the present invention may be substantially inflexible open containers comprised of polyamide having a relative viscosity in the range of about 25 to 65 and especially in the range 25 to 50 and in particular in the ranges 30 to 45 and/or 30 to 40. The term "substantially inflexible" is used herein to distinguish the containers of the present invention from known flexible containers, for example containers manufactured from flexible film. The containers of the present invention may be referred to in the packaging industry as rigid containers. The containers are preferably of thickness in the range 2 to 30 mils and especially in the range 5 to 20 mils and in particular in the range 8 to 15 mils. The preferred polyamide is nylon 66. The containers may be open-topped containers having a ratio of the width of the container to the depth of the container of at least 3:1. Preferred containers are of depth less than about 1.5 inches. In an embodiment the containers are open-topped and have inwardly sloping sides.

In a preferred embodiment of the present invention the articles are in the form of trays, pie plates and the like.

Indicia and other marks may be incorporated into the design of the mould. Any such indicia and other marks may be readily apparent in the moulded article, this being a feature of articles moulded in a porous metal mould.

As discussed hereinabove, a number of polymers may be used in the process of the invention. It may be preferred to incorporate additives, for example stabilizers, pigments, fillers and/or nucleating agents in the polymers used in the process. The polymer may be a blend of polymers. The particular composition used may depend on processability, economics and the desired properties of the resultant article. Preferred polymers are polyamides especially nylon 6 and nylon 66. For some end uses, especially when the melting point of the polymer may be important, nylon 66 may be preferred. Fillers may be blended into the polyamide especially the following fillers: calcium carbonate, calcium silicate, kaolin, calcined kaolin, aluminum silicate, magnesium silicate for example talc, silica and silane-treated silica and silicate fillers and in particular 20–60% by weight of these fillers. A wide range of pigments may be used. Ferric oxide, titanium dioxide, carbon black, aluminum, ultramarine blue, alumina lakes especially 3-carboxy-5-hydroxy-1-p-sulfophenyl-4-p-sulfophenylazopyrazole trisodium salt alumina lake, chromic oxide and zinc chromate may be preferred pigments for nylon 66 articles intended for use at elevated temperatures and especially for uses involving food contact at elevated temperatures. It may be desirable to incorporate heat stabilizers, for example salts of copper and hindered phenols, into the polyamide. It may also be preferred to use a modified polyamide, for example polyhexamethylene adipamide modified by the addition of bishexamethylene triamine during polymerization of the polymer, or to use nylon 66 polymerized in the presence of one or more of manganous hypophosphite, sodium hypophosphite and phosphoric acid. Preferred compositions are the compositions of polyamide and 3-carboxy-5-hydroxy-1-p-sulfophenyl-4-p-sulfophenylazopyrazole, trisodium salt, alumina lake.

The invention may be illustrated by the following examples:

EXAMPLE I

To illustrate the effect of process variables a series of runs were carried out using a nylon 66 polymer of 40 RV containing 30% wollastonite as filler together with 640 ppm of copper stearate and 2% ferric oxide. The viscosity of the polymer blend was 1430 poise at 288° C. A web of molten polymer was extruded onto a series of porous metal moulds having an average pore size of 5–12 microns. The moulds were located on the periphery of a moving thermoforming wheel (see FIG. I). The die was located above the thermoforming wheel. The position of the die has been defined in terms of $r$ and $\theta$, $r$ being the distance in inches of the die as measured from the axis of the drum, which had a radius of 17 inches, and $\theta$ being the angle formed at the axis of the drum with respect to vertical by the position of the die. The angle $\theta$ was measured in the direction of movement of the drum. The vacuum applied was approximately 10 psi. The termoformed article was a tray of 4 inch outer diamter and having a base of 2.5 in. diameter, a depth of 11/16 in. and with walls sloping at 55° to the horizontal.

In Table I in the "Comments" column, "front" indicates that portion of the mould which first comes in contact with the web of polymer, "lip" indicates the lip of the thermoformed tray on which the molten polymer is supported prior to being drawn into the mould, "melt folds" indicates that the termoformed tray had folds of polymer for example due to polymer extruded at low speed sticking to the mould, i.e. the tray surface was corrugated, "pre-chill" has been defined hereinbefore and "front wall flows into lip" indicates that, prior to the application of vacuum, the mould approached a vertical position and the molten polymer flowed onto the lip of the mould.

EXAMPLE II

To illustrate the use of the process of the invention on a variety of polymers a series of runs were carried out using the technique described in Example I above. The articles thermoformed where circular pie plates approximately 4 inches in diameter and 11/16 inches in depth. The vacuum applied to the mould was approximately 10 psi. The drum speed was in the range 18 to 27 feet per minute in all cases. The die was located such that $r$ was 21 inches and $\theta$ was 0°.

Further process conditions, the polymers used and the results obtained are given in Table II. No attempt was made to optimize the process conditions for the various polymers tested. Thermoformed articles were however produced in all cases.

TABLE I

| Run No. | Through Put (lb./hr.) | Die Position r | Die Position θ | Drum Speed (ft./min.) | Vacuum Application θ | Gauge (mils) Front Wall | Gauge (mils) Back Wall | Gauge (mils) Side Wall | Gauge (mils) Lip | Gauge (mils) Base | Weight (gms.) | Tray Comments |
|---|---|---|---|---|---|---|---|---|---|---|---|---|
| 1 | 82 | 19.5" | +29.5° | 36.9 | 34° | 8.6 | 8.6 | 9.0 | 13.5 | 11.2 | 2.56 | |
| 2 | 82 | 19.5" | +29.5° | 20.5 | 34° | 19.4 | 12.6 | 14.4 | 17.6 | 19.3 | 4.18 | Front Thicker |
| 3 | 82 | 19.5" | +29.5° | 31.2 | 34° | 11.3 | 9.2 | 9.7 | 13.8 | 13.7 | 3.04 | |
| 4 | 82 | 19.5" | +29.5° | 44.5 | 34° | 7.2 | 7.1 | 8.1 | 12.0 | 10.9 | 2.27 | |
| 5 | 82 | 19.5" | +29.5° | 36.9 | 44° | 9.7 | 7.2 | 8.1 | 12.8 | 11.8 | 2.64 | |
| 6 | 82 | 19.5" | +29.5° | 36.9 | 55° | 11.6 | 5.8 | 7.7 | 11.3 | 10.9 | 2.57 | Front Thicker |
| 7 | 97 | 19.5" | +29.5° | 36.9 | 34° | 15.9 | 12.9 | 12.4 | 18.5 | 16.7 | 3.80 | |
| 8 | 97 | 19.5" | +29.5° | 20.5 | 34° | 28.6 | 19.5 | 22.8 | 27.7 | 25.8 | 6.15 | Melt Folds |
| 9 | 97 | 19.5" | +29.5° | 31.2 | 34° | 21.4 | 15.4 | 15.5 | 20.9 | 20.0 | 4.51 | |
| 10 | 97 | 19.5" | +29.5° | 44.5 | 34° | 13.8 | 10.2 | 10.8 | 15.6 | 13.6 | 3.25 | Walls Equalizing as Speed Increases |
| 11 | 97 | 19.5" | +29.5° | 36.9 | 44° | 20.4 | 9.5 | 13.6 | 18.2 | 17.2 | 3.91 | |
| 12 | 97 | 19.5" | +29.5° | 36.9 | 54° | 21.3 | 7.2 | 12.3 | 19.1 | 16.8 | 3.90 | |
| 13 | 82 | 21.0" | −8.2° | 36.9 | 54° | 5.5 | 12.5 | 9.3 | —* | 9.2 | 2.61 | *Front Wall Flows Into Lip |
| 14 | 82 | 21.0" | −8.2° | 36.9 | 44° | 11.3 | 6.2 | 8.0 | 11.2 | 13.7 | 2.77 | Pre Chilling at Lip |
| 15 | 82 | 21.0" | −8.2° | 36.9 | 34° | 9.7 | 7.1 | 9.4 | 12.6 | 14.5 | 2.67 | Pre Chilling at Lip |
| 16 | 82 | 21.0" | −8.2° | 36.9 | 24° | 10.2 | 8.4 | 9.2 | 12.7 | 13.1 | 2.67 | Pre Chilling at Lip |
| 17 | 82 | 21.0" | −8.2° | 36.9 | 14° | 8.3 | 8.3 | 8.3 | 13.0 | 12.4 | 2.57 | Pre Chilling at Lip |
| 18 | 82 | 21.0" | −8.2° | 36.9 | 4° | 7.9 | 9.2 | 9.9 | 13.1 | 12.7 | 2.61 | Pre Chilling at Lip |
| 19 | 82 | 21.0" | −8.2° | 36.9 | −6° | 7.9 | 9.8 | 9.2 | 13.4 | 12.4 | 2.54 | |
| 20 | 82 | 21.0" | −8.2° | 36.9 | −16° | 8.9 | 9.2 | 8.0 | 13.8 | 13.1 | 2.50 | |

TABLE II

| Run No. | Polymer | Extrusion Die Temperature (° F) | Extrusion Die Pressure (psi) | Gauge (ave. mil) | Crystallization** | Melt Strength*** |
|---|---|---|---|---|---|---|
| 21 | Polyethylene terephthalate (Homopolymer 30RV obtained from E.I. du Pont de Nemours and Company) | 530 | NA | 8 | slow | low |
| 22 | Polycarbonate (Lexan* 101 obtained from General Electric) | 540 | 2700 | 15 | medium | high |
| 23 | Polymethyl pentene-1 (TPX* grade RT obtained from Imperial Chemical Industries) | 560 | 800 | 9 | slow | high |
| 24 | Nylon 11 (Rilsan* BESN-C obtained from Aquitaine-Organico) | 520 | 1800 | 15 | slow | low |
| 25 | Nylon 12 (Type L2101F* obtained from Olin Chemicals) | 520 | 2100 | 12 | slow | medium |
| 26 | Nylon 6 (Type 212-001* obtained from Firestone) | 520 | 1000 | 11 | fast | low |
| 27 | Polysulfone (Bakelite* P3500 obtained from Union Carbide) | 600 | 5000 | 13 | fast | high |
| 28 | Polyacetal (Delrin* 550 NClO obtained from E.I. du Pont de Nemours and Company) | 400 | 3100 | 15 | slow | high |
| 29 | Polypropylene (Profax* 81895 obtained from Hercules) | 450 | 2800 | 15 | slow | high |
| 30 | Polyethylene (density 0.956, melt index 1.73 manufactured by Du Pont of Canada) | 450 | NA | 11 | slow | high |

*denotes trademark
NA not available
**crystallization rate of extruded polymer in relative terms based on visual observations: fast-crystallization essentially complete immediately after polymer was drawn into mould, slow-crystallization not complete until a later stage in the process.
***melt strength in relative terms (based on visual observation).

EXAMPLE III

To illustrate the use of articles manufactured by the process of the present invention frozen uncooked fruit pies were placed in circular trays which were 4.25 inches in diameter and 1 inch deep and which were manufactured from a nylon 66 resin of 65 relative viscosity containing 200 ppm of cupric acetate and 2000 ppm of potassium iodide. The pies were baked in a convection oven and were judged to be properly cooked when the temperature of the pie filling reached 200° F. and the pastry on the pie was brown.

The results are given in Table III.

TABLE III

| Cooking Temperature (°F.) | Comments |
|---|---|
| 325 | After 60 minutes pie filling overcooked but pastry not brown. |
| 375 | Pie cooked after 55 minutes. Tray maintained dimensions. |
| 425 | Pie cooked after 35 minutes. Tray maintained dimensions. |
| 475 | Pastry burnt (blackened) before pie filling reached 200° F. Tray maintained dimensions. |

EXAMPLE IV

Frozen uncooked 8 ounce turkey pies in polyamide trays or in commercially available aluminum trays were cooked in a domestic convection oven at different temperatures. The polyamide trays were circular, 4.5 inches in diameter, 13/16 inches in depth and manufactured from a nylon 66 resin of a relative viscosity of 40 containing 30% wollastonite, 2% ferric oxide and 640 ppm of cupric strearate.

The temperature of the pie filling was measured after 33 minutes. The results are given in Table IV.

When pies of the type described above were cooked in a quartz plate infrared oven the temperature of the pie filling after 30 minutes was found to be 190° F. and 200° F. for the pies in the nylon and aluminum trays respectively. There were no differences in the appearance of the pies cooked in the two types of trays.

Similar frozen pies were also heated in a microwave oven for 20 seconds. The bottom of the aluminum tray was still cold while the bottom of the nylon tray was hot. The pies were immediately cooked for 20 minutes at 440° F. in a domestic convection oven. On removal from this oven the crust of the pie in the nylon tray was brown and the pie filling temperature was 195° F. whereas the crust on the pie in the aluminum tray was only brown in the centre and the pie filling temperature was 185° F.

TABLE IV

| Oven Temperature (°F.) | Position of Tray* | Pie Filling Temperature after 33 Minutes. (°F.) | |
|---|---|---|---|
| | | Nylon Tray | Aluminum Tray |
| 425 | on a cookie sheet on bottom rack of oven | 180 | 174 |
| 425 | on a black cookie sheet on bottom rack of oven | 140 | 140 |
| 450 | bottom rack of oven no cookie sheet | 194 | 145 |
| 425 | centre rack of oven | 160 | 95 |
| 425 | centre rack of oven cookie sheet on bottom rack | 154 | 109 |

*The oven had three rack positions, namely top, centre and bottom. A cookie sheet is an aluminum foil sheet covering a substantial fraction of the area of the oven rack. The tray was approximately in the middle of the cookie sheet.

The embodiments of the invention which an exclusive property or privilege is claimed are defined as follows:

1. A process for the continuous melt thermoforming of articles of substantially uniform thickness derived from a thermoplastic polymer of low zero shear viscosity comprising the steps of:
   a. extruding a flat web of molten polymer in a downward direction and directly over a series of mould cavities formed by a mould surface in a mould block moving at a predetermined speed, and sequentially covering said mould cavities with said flat web,
   b. applying a vacuum to the mould cavities sufficient to cause the web of molten polymer to contact the surface of the mould cavity, said mould block having a lower surface and being constructed substantially entirely from porous sintered metal whereby said vacuum is uniformly transmitted between said lower surface and said mould cavities in said mould surface.
   c. cooling the polymer in said cavities,
   d. maintaining substantially uniform thickness of the articles by controlling the extrusion of the flat web of polymer, the application of vacuum, the contacting of the web of molten polymer with the mould cavities and the speed at which the mould cavities move, and
   e. removing the articles.

2. The process of claim 1 in which the mould cavities are located on the periphery of a wheel.

3. The process of claim 2 in which the porous metal of the mould has a pore size of not greater than 12 microns.

4. The process of claim 3 in which the metal of the mould is selected from the group consisting of bronze and stainless steel.

5. The process claim 2 in which a portion of the periphery of the wheel is made from porous metal.

6. The process of claim 1 in which the mould cavities are located on a continuous belt.

7. The process of claim 1 in which the thermoplastic polymer is selected from the group consisting of polyamides, polyesters, polyolefins, acetals, polycarbonates, polysulfones, polyacrylates and ionomeric resins.

8. The process of claim 1 in which the thermoplastic polymer is a polyamide.

9. The process of claim 1 in which the thermoplastic polymer is a polyamide having a relative viscosity greater than 25.

10. The process of claim 1 in which the thermoplastic polymer is polyhexamethylene adipamide having a relative viscosity in the range 25 to 65 .

11. The process of claim 1 in which the thermoplastic polymer is polyhexamethylene adipamide having a relative viscosity in the range 25 to 50.

12. The process of claim 1 in which the thermoplastic polymer is a polyamide blended with an additive selected from the group consisting of fillers, pigments, heat stabilizers and mixtures thereof.

13. The process of claim 1 in which the thermoplastic polymer is polyhexamethylene adipamide blended with an additive selected from the group consisting of fillers, pigments, heat stabilizers and mixtures thereof, said polyhexamethylene adipamide having a relative viscosity in the range 25 to 50.

14. The process of claim 1 in which the thermoplastic polymer is polyhexamethylene adipamide blended with an additive selected from the group consisting of fillers, pigments, heat stabilizers and mixtures thereof, said polyhexamethylene adipamide having a relative viscosity in the range 30 to 45.

15. The process of claim 1 in which the moulds defining the mould cavities are cooled.

16. The process of claim 1 in which the articles produced are substantially free from distortion.

17. The process of claim 1 wherein said mould defining said mould cavity is comprised entirely of porous metal.

18. The process of claim 1 wherein a uniform vacuum is applied to the mould cavities immediately after the web of molten polymer covers all of such mould cavity.

19. The process of claim 1 wherein a uniform vacuum is applied to the mould cavities before the web of molten polymer covers all of such mould cavity.

20. The process of claim 1 in which the thermoplastic polymer is polyethylene.

* * * * *